(12) United States Patent
DeSantolo et al.

(10) Patent No.: US 8,167,282 B2
(45) Date of Patent: May 1, 2012

(54) AEROSOL GENERATOR

(75) Inventors: Anthony Michael DeSantolo, North Plainfield, NJ (US); Robert Scott Windeler, Clinton Township, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 13/373,066

(22) Filed: Nov. 3, 2011

(65) Prior Publication Data

US 2012/0049393 A1   Mar. 1, 2012

Related U.S. Application Data

(62) Division of application No. 11/634,002, filed on Dec. 5, 2006, now Pat. No. 8,069,690.

(60) Provisional application No. 60/750,966, filed on Dec. 16, 2005.

(51) Int. Cl.
  *B01F 3/04*   (2006.01)
(52) U.S. Cl. .............. 261/133; 261/152; 261/121.1
(58) Field of Classification Search ............ 261/133, 261/142, 152, 153, 155, 121.1, DIG. 65
  See application file for complete search history.

(56) References Cited

U.S. PATENT DOCUMENTS

| | | | |
|---|---|---|---|
| 3,883,336 A | 5/1975 | Randall | 65/18 |
| 4,388,098 A | 6/1983 | Takahashi et al. | 65/157 |
| 4,666,247 A | 5/1987 | MacChesney et al. | 350/96.34 |
| 5,622,750 A | 4/1997 | Kilian et al. | 427/163.2 |
| 6,101,316 A * | 8/2000 | Nagashima et al. | 392/388 |
| 6,299,147 B1 * | 10/2001 | Mitter | 261/128 |
| 6,546,757 B1 | 4/2003 | Morse | 65/377 |
| 6,863,268 B2 * | 3/2005 | Zhang | 261/130 |
| 2002/0110714 A1 * | 8/2002 | Andrews et al. | 429/24 |
| 2003/0042630 A1 * | 3/2003 | Babcoke et al. | 261/121.1 |
| 2005/0069638 A1 | 3/2005 | Rajala et al. | 427/163.2 |
| 2006/0001952 A1 | 1/2006 | Janka et al. | 359/342 |

OTHER PUBLICATIONS

D. Y. H. Pui et al., Experimental Study of Particle Deposition . . . , *Aerosol Sci and Technol.*, vol. 7, pp. 301-315 (1987).

(Continued)

*Primary Examiner* — Charles Bushey
(74) *Attorney, Agent, or Firm* — Law Offices of Michael J. Urbano

(57) ABSTRACT

A method of fabricating a glass body that includes a multiplicity of constituents, at least one of which is a dopant (e.g., a rare-earth element) having a low vapor pressure (LVP) precursor includes the steps of: (a) generating an aerosol from the LVP precursor; (b) separately generating vapors of the other constituents; (c) convecting the aerosol and vapors to deposition system including a substrate; and (d) forming at least one doped layer on a surface of the substrate. In one embodiment, the method also includes filtering the aerosol so as to remove aerosol particles outside of a particular range of sizes. Also described is a unique aerosol generator that is particularly useful in generating aerosols of rare-earth dopants. Particular embodiments directed to the fabrication of Yb-doped optical fibers are described.

1 Claim, 3 Drawing Sheets

OTHER PUBLICATIONS

T. F. Morse et al., Aerosol Transport . . . , *J. Aerosol Sci.*, vol. 22, No. 5, pp. 657-661, 663-666 (1991).

T. F. Morse et al., Aerosol techniques . . . , *J. Non-Crystalline Solids*. vol. 129, pp. 93-100 (1991).

S. Tammela et al., "Potential of nanoparticle technologies for next generation rare earth doped fibers," available from Internet at website www.liekki.com on or before Oct. 6, 2006.

S. Tammela et al., "The Potential of Direct Nanoparticle Deposition for the Next Generation of Optical Fibers," available from Internet at website www.liekki.com on or before Oct. 6, 2006.

S. Tammela et al., "The Potential of Direct Nanoparticle Deposition for the Next Generation of Optical Fibers," electronic preprint available online from the Society of Photo-Optical Instrumentation Engineers on or before Oct. 6, 2006.

\* cited by examiner

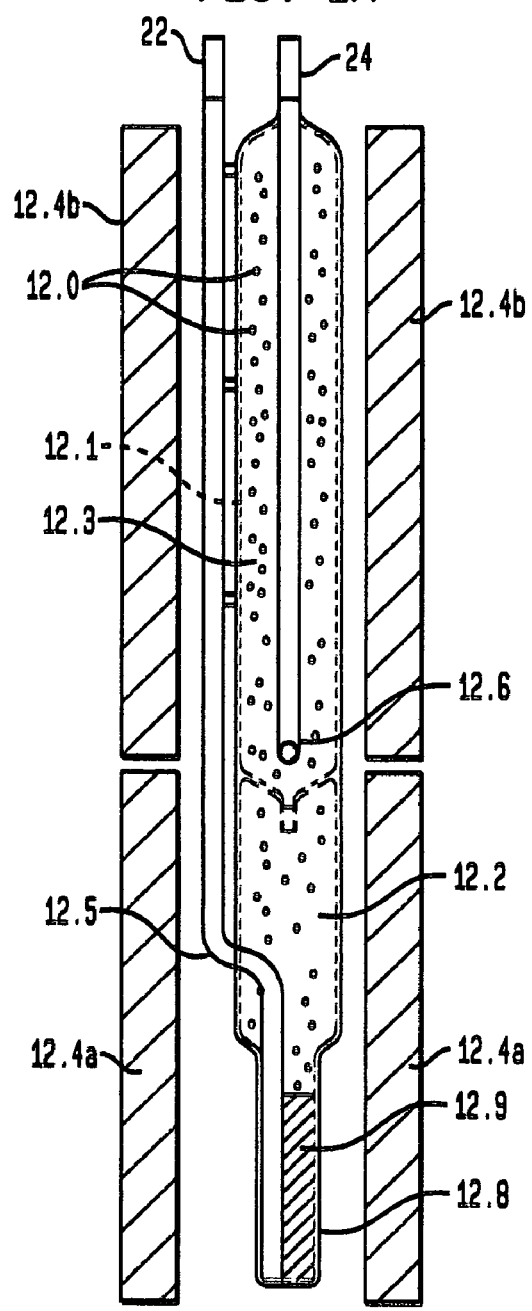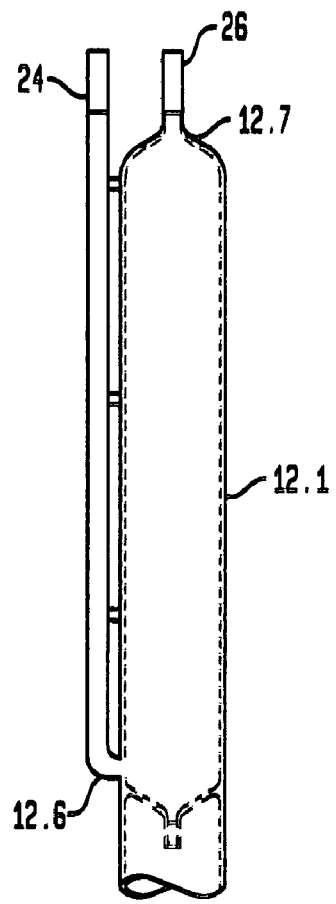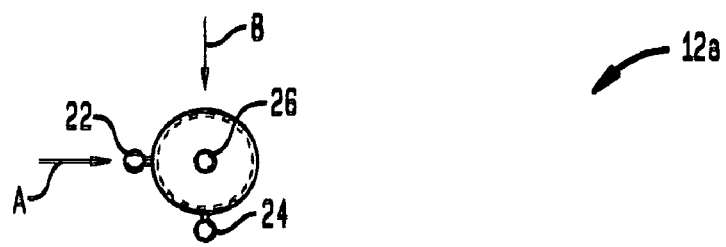

AEROSOL GENERATOR

CROSS REFERENCE TO RELATED APPLICATIONS

This application is a division of parent application Ser. No. 11/634,002 filed on Dec. 5, 2006 now U.S. Pat. No. 8,069,690, entitled "Apparatus and Method for Fabricating Glass Bodies Using an Aerosol Delivery System," which in turn claims priority from provisional application Ser. No. 60/750,966 filed on Dec. 16, 2005 and entitled "Aerosol Delivery Method for Optical Fiber and Fiber Preform Fabrication." Both of these applications are incorporated herein by reference.

BACKGROUND OF THE INVENTION

1. Field of the Invention

This invention relates to glass bodies (e.g., optical fibers, planar waveguides, glass soot) and, more particularly, to apparatus and methods for fabricating rare-earth (RE)-doped optical fibers.

2. Discussion of the Related Art

In the standard MCVD technique for fabricating optical fibers, preforms are made by flowing relatively high vapor pressure (HVP) precursor gasses (e.g., $SiCl_4$, $GeCl_4$ and $POCl_3$) and oxygen down a rotating silica substrate tube. An external hydrogen-oxygen torch slowly traverses the length of the tube, locally heating a small section of the tube. The gas stream, which moves much faster than the torch, is heated as it approaches the torched section and becomes hot enough that the precursors react with the oxygen and form oxide aerosol particles. These particles grow in size by colliding and coalescing with one another. As the gas stream leaves the torched section, it remains hot relative to the tube wall. This temperature gradient between the tube and gas stream causes the aerosol particles to move towards and deposit onto the tube wall, forming a soot layer. As the torch passes over this soot layer, the soot sinters into a solid glass layer. The process is iterated to deposit multiple glass layers on the inside wall of the tube; for example, hundreds of layers may be deposited to fabricate the core of a conventional silica fiber, but many fewer (e.g., 3-15) are typically deposited to fabricate the core of a RE-doped fiber. After layer deposition is complete, the tube is heated and collapsed to form a solid rod known as a preform. Optical fiber is drawn from the preform using standard techniques.

Not all desired dopants can be delivered using this standard MCVD method because appropriate HVP precursors do not exist. An appropriate precursor needs to have a relatively high vapor pressure (above ~1 torr at room temperature) and should not contain any chemicals (e.g., hydrogen, water) that will adversely affect the properties of the deposited glass. Some desirable dopants such as RE elements [particularly erbium (Er) and ytterbium (Yb)] have low vapor pressure (LVP) precursors and cannot be delivered using conventional vapor-phase approaches, such as standard MCVD.

In an attempt to overcome this problem, several fabrication methods have been developed in the prior art for using LVP RE precursors, but they all have significant limitations. Below are brief descriptions of the most common methods followed by their most significant limitations.

Solution Doping: A soot layer is deposited on the inside wall of a substrate tube using standard dopants, but the soot layer is not sintered. The soot layer is soaked with a liquid solution containing a LVP RE precursor. When the solution is drained out of the tube, the soot layer acts like a sponge holding a certain amount of the solution in the pores of the soot. The soot layer containing the LVP precursor is dried, the LVP precursor is oxidized, and the soot layer is sintered. Solution doping has the following limitations: (i) The reproducibility of the LVP dopant concentration is poor from preform to preform; (ii) The amount of liquid held by the soot layer is dependent on its porosity, which is very difficult to control; and (iii) The process is very time consuming typically taking 1-2 hours per deposited glass layer compared to roughly 10 minutes for a standard MCVD glass layer.

Chelates: Preforms have been fabricated using chelate precursors of RE elements. Chelates are large organo-metallic compounds that have relatively high vapor pressures. Chelate processes have the following limitation: The chelates contain undesirable elements such as hydrogen and to date have not produced glass with the purity needed for high quality optical fibers.

Vapor Delivery: An ampoule containing the desired LVP RE precursor is placed inside an MCVD substrate tube. The ampoule is heated with an external source (such as a flame or furnace) to a temperature high enough to obtain the necessary vapor pressure. See U.S. Pat. No. 4,666,247 granted to J. B. MacChesney et al. on May 19, 1987, which is incorporated herein by reference. The ampoule approach has the following limitations: (i) The precursor vapor pressure (and therefore the amount delivered) is very sensitive to temperature, which is difficult to control because an external heat source heats the RE source material, which sits within several concentric glass tubes; (ii) Flowing gas streams cool the tubes, causing uncertainty in the actual source temperature; (iii) Only a small surface area exists between the precursor and the carrier gas, so it is unlikely that the precursor will become saturated in the carrier gas. This leads to variations in the amount of precursor delivered if the surface changes either in size or gets coated by, for example, a RE oxide layer; and (iv) When the precursor leaves the ampoule, some or all of the precursor reacts with the surrounding oxygen to form metal oxide aerosol particles. The size of these aerosol particles is not controlled. If large particles are formed, current wisdom suggests that they will form clusters, which may be detrimental for RE-doped preforms and fibers.

Liquid Aerosol Delivery: A solution, which contains organo-metallic precursors for all the desired dopants in an organic solvent, is nebulized into a liquid aerosol (droplets) and delivered into the substrate tube. As the liquid aerosol approaches the hot zone, the solvent evaporates and the resulting solid aerosol particles oxidize and deposit on the substrate tube as a layer of soot. Care is taken not to sinter the soot layer. The soot layer goes through several processing (purification) steps to remove undesirable elements such as hydrogen (H) and carbon (C). Finally the soot layer is sintered. See, for example, two papers by T. F. Morse, et al., *J. Non-Crystal. Solids*, Vol. 129, pp. 93-100 (1991) and *J. Aerosol Sci.*, Vol. 22, No. 5, pp. 657-666 (1991), both of which are incorporated herein by reference. According to Morse et al., *J. Non-Crystal. Solids*, supra at page 96, column 2, the "solution should contain all components of the glass structure in each aerosol particle to assure microscopic homogeneity that will minimize crystalline inclusions in the glass" (emphasis added). The phrase "all components" includes, for example, the precursors of standard HVP dopants such as Ge and/or P as well as selected LVP RE elements such as Nd and/or Er. This liquid aerosol approach has the following limitations: (i) The solution is flammable and can lead to explosions; (ii) A new solution needs to be made whenever a different glass composition is desired; (iii) The process is time consuming; and (iv) The process is not expected to produce very low loss glass inasmuch as the reaction products include contaminants such as $H_2O$ and $H_2$ as well as the desired glass oxides.

Thus, it would be desirable to have an aerosol delivery system that is capable of handling LVP precursors, such as RE precursors, without one or more of the drawbacks of the above-described liquid aerosol delivery system.

In addition, it would be desirable to have such a delivery system that is applicable to not only MCVD systems, but also other optical fiber fabrication systems as well (e.g., OVD and VAD).

Finally, it would be desirable to have such a delivery system that is applicable to the fabrication of glass bodies in general including not only optical fibers and planar waveguides but also glass soot.

BRIEF SUMMARY OF THE INVENTION

In accordance with one aspect of our invention, we claim a method of fabricating a glass body (e.g., an optical waveguide, a planar waveguide, or glass soot) that includes a multiplicity of constituents, at least one of which is a first dopant (e.g., a RE element) having a first LVP precursor. The method comprises the steps of: (a) generating a first single-component aerosol (SCA) from the LVP precursor; that is, each first aerosol particle includes only the LVP precursor of the first dopant; (b) separately generating vapors of the other constituents; generating steps (a) and (b) taking place at a location remote from the deposition system used to form the glass body; (c) convecting the aerosol of step (a) and the vapors of step (b) from the remote location through a conduit system to the deposition system, which includes a substrate; and (d) forming at least one doped layer on a surface of the substrate.

In one embodiment, wherein the glass body includes a second dopant having a second LVP precursor, our method includes the additional step of separately generating a second SCA from the second LVP precursor; that is, each second aerosol particle also includes only the LVP precursor of the second dopant. The two aerosols may be maintained separate from one another while being convected to the deposition system. Alternatively, they may be mixed with one another and/or the vapors of the other constituents, and the mixture may then be convected to the deposition system.

In accordance with another aspect of our invention, we claim a method of fabricating a glass body that includes a multiplicity of constituents, at least one constituent being a first dopant having a first LVP precursor comprising the steps of: (a) generating a first aerosol comprising first particles that include the first LVP precursor, the generating step including the steps of (a1) providing a vapor of the LVP precursor and (a2) supersaturating the LVP vapor to form the aerosol; (b) separately generating vapors of the other constituents; (c) convecting the aerosol of step (a) and the vapors of step (b) to a deposition system including a substrate; and (d) forming on a surface of the substrate at least one doped layer comprising the dopants contained in the aerosol and vapors convected in step (c).

In accordance with yet another aspect of our invention, the aerosol generator comprises a vessel having first and second chambers coupled in fluid-flow communication with one another. In one embodiment, the first chamber is a bubbler chamber and the second chamber is a condenser chamber. A heater surrounds the first chamber, keeping it at an essentially constant temperature. A first input port enables primary carrier gas to be fed into the bubbler chamber, and a second input port enables cooler, secondary carrier gas to be fed into the condenser chamber. An output port is coupled to the condenser chamber. In operation, the precursor (typically a solid at room temperature) is placed in the bubbler chamber, which is heated to a relatively high temperature sufficient to liquefy the precursor and to obtain a desired vapor pressure of the precursor. The primary carrier gas convects the precursor vapor away from the precursor liquid and into the condenser chamber. (Preferably, the precursor vapor fully saturates the primary carrier gas.) Since the precursor vapor cannot be delivered at such high temperatures (i.e., it would condense on the walls of standard tubing used to deliver the vapor to the deposition system), it is quickly cooled by the cooler, secondary carrier gas fed into the second input port. Consequently, an aerosol of the precursor is formed in the condenser chamber and is extracted via the output port. The aerosol can be delivered at or slightly above room temperature through standard tubing without significant agglomeration or deposition, which enables the aerosol to be convected into a standard deposition system along with standard vapor species.

In another embodiment, the first chamber is a reaction chamber. In this case, a sub-precursor is placed in the first chamber, and the primary gas is a gas that reacts with the sub-precursor to generate a precursor compound in vapor form. This vapor is convected into the condenser chamber, a cooler secondary carrier gas is flowed into the condenser chamber, and an aerosol is formed in the manner described above.

Our delivery system may be used in conjunction with a variety of glass deposition systems, such as MCVD, OVD and VAD.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 2 shows two side views [Parts (A) and (B)] and an end view [Part (C)] of an aerosol generator, in accordance with another embodiment of our invention. Part (A) is a side view looking along arrow A of Part (C), whereas Part (B) is a side view looking along arrow B of Part (C). Note, the heaters 12.4a and 12.4b of Part (A) are shown schematically;

DETAILED DESCRIPTION OF THE INVENTION

Delivery System

Our invention is applicable to the fabrication of glass bodies on a substrate. The glass bodies may take the form of glass soot layers that are deposited on a surface of a heated substrate and then sintered to form glass layers. Such glass layers may be used to from optical fibers, for example. Alternatively, the glass bodies formed by our invention may take the form of glass soot that is not intentionally deposited on a heated substrate and sintered; rather it is flowed to a suitable collector (e.g., the soot is collected on the surface of a vacuum bag, which serves as an unheated substrate). Such soot may be easily removed from the collector and then used, for example, in sol-gel processes for making optical fibers. In any case, the glass body includes at least one dopant that has a LVP precursor. Such dopants include RE-elements (e.g., Er, Yb, Nd, Tm, Ho and La, or a combination of them) as well as aluminum (Al) and alkaline earth elements (e.g., Be, Mg and Ca).

Illustratively, our invention is applicable to the fabrication of optical fibers by MCVD, which entails depositing soot glass layers on the inside surface of a heated substrate tube, sintering the layers, collapsing the tube into a preform, and drawing optical fibers from the preform. It is also applicable to the fabrication of optical fibers fabricated by VAD and OVD, which entail depositing soot glass layers onto the outside or end surface of a rotating cylinder, sintering the soot layers, and drawing optical fibers from the preform. On the other hand, our invention is also applicable to the fabrication of planar optical waveguides, which entails depositing glass layers on a major surface of a planar substrate. For simplicity and for purposes of illustration only, however, the following description will focus on the fabrication of optical fibers using heated substrate tubes.

Various aspects of our invention involve the generation and delivery of at least one aerosol of a LVP precursor to a deposition system. By the term aerosol we mean a particle-gas combination in which solid or liquid LVP precursor particles are suspended in a carrier gas. Each particle includes a multiplicity (typically thousands) of molecules of the LVP precursor. In general, an aerosol may be a single-component aerosol (SCA) or a multi-component aerosol (MCA). In a SCA each particle includes molecules of only a single LVP precursor. Even when two or more aerosols are mixed, the particles maintain their separate identities; that is, each particle includes molecules of only a single precursor. On the other hand, in a MCA each particle comprises at least two compounds that include precursors of the dopants or host material and/or oxides of the dopants or host materials.

Single-Component Aerosols

Figure 1:
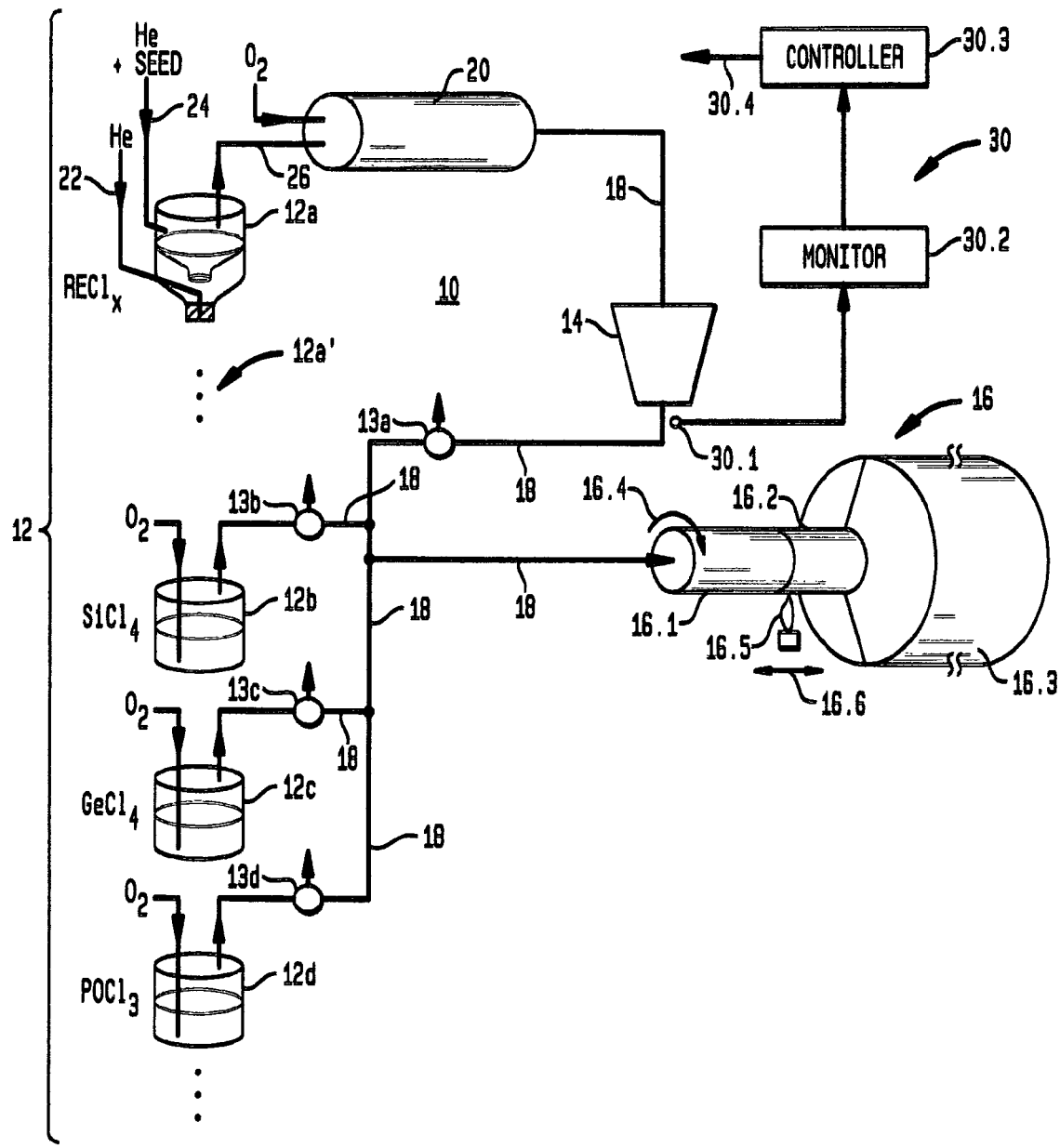
FIG. 1 is a schematic, partially isometric view of apparatus for fabricating RE-doped optical fibers, in accordance with one embodiment of our invention.

In accordance with one aspect of our invention, as shown in FIG. 1, apparatus 10 for fabricating an optical fiber includes a multiplicity of precursor sources 12, which generate precursors of the various constituents (e.g., host material such as silica, LVP dopants identified above, and standard HVP dopants such as Ge and P) of the optical fiber. The sources 12 include at least one aerosol generator 12a, which provides a SCA of a LVP precursor (e.g., a RE chloride). (A separate aerosol generator, indicated by the ellipsis 12a', would be used to generate a SCA of another LVP precursor.) In addition, the sources 12 include at least one conventional vapor generator (or bubbler) 12b, 12c, 12d, which provides vapors of other fiber constituents, typically those that have HVP precursors (e.g., chlorides of Si, Ge and PO).

The sources 12 are located remote from glass-layer deposition system 16. Illustratively, they are coupled in parallel fluid-flow communication with one another but in series fluid-flow communication with deposition system 16. Those skilled in the art will appreciate that system 16 could be, for example, an MCVD system, an OVD system, a VAD system, or any other deposition system compatible with our precursor delivery system. For purposes of illustration only, the description that follows will assume that deposition system 16 is a standard MCVD system.

Thus, MCVD system 16 typically includes a feedstock tube 16.1, a substrate tube 16.2, and an exhaust tube 16.3 arranged in tandem with one another. The feedstock, substrate and exhaust tubes are rotated (arrow 16.4) about their common longitudinal axis, and a heat source (i.e., a torch) 16.5 is translated (arrow 16.6) along that axis to heat the substrate tube. The vapor and aerosol precursors enter the feedstock tube 16.1 via a standard rotary union (not shown). This union allows the feedstock tube to rotate on the MCVD lathe while the delivery tubing 18 remains stationary. The aerosol precursor can be delivered into system 16 using the same port as the vapor precursors, or it can be delivered via a separate port. We have found it convenient to deliver the aerosol precursor using its own port. In addition, we prefer to deliver the vapor precursors through a port that is on axis with the feedstock tube so that a minimal amount of tube bending is required. This design also allows a concentric tube to be readily positioned within the feedstock tube 16.1, as illustrated by tube 16.7 in the embodiment of FIG. 3.

By delivery we mean the process of generating and transporting precursors and associated gases from the generators 12 through a conduit system (e.g., tubing 18) to the deposition system 16.

After being delivered to the MCVD feedstock tube 16.1, the aerosol and vapor precursors are oxidized in the hot zone of the substrate tube 16.2, the oxides form a soot that deposits onto the inside of the substrate tube 16.2, the deposited soot is sintered, the substrate tube is collapsed into a preform, and the preform is drawn into an optical fiber.

The multiplicity of sources 12 includes one for each of the constituents of the optical fiber to be formed. For example, to fabricate a silica optical fiber doped with a RE, Ge and P, the aerosol generator 12a provides a SCA of the RE precursor (e.g., a RE-chloride such as $ErCl_3$ or $YbCl_3$), vapor generator 12b provides a vapor of a silica precursor (e.g., $SiCl_4$), vapor generator 12c provides a vapor of a Ge precursor (e.g., $GeCl_4$), and vapor generator 12d provides a vapor of a P precursor (e.g., $POCl_3$).

In general, the carrier gas used for the sources 12 should be inert (e.g., He, Ar), beneficial to the production of high quality glass (e.g., $O_2$), or useful for other processing reasons that do not adversely affect the fiber (e.g., $N_2$, $Cl_2$). In the aerosol generator 12a, He is typically used since it helps minimize bubble formation during sintering. On the other hand, $O_2$ is typically used in the generators (bubblers) 12b, 12c, 12d. (Since the bubblers are maintained at relatively low temperatures (e.g., <100° C.), the metal chloride precursors do not oxidize in the bubbler.)

Not shown, but well known to those skilled in the art, are (i) additional sources of carrier gases (e.g., He, $O_2$) that may be coupled into the delivery system directly; i.e., through neither an aerosol generator 12a nor a bubbler 12b, 12c or 12d and/or (ii) additional sources of dopant gases that are vapors at room temperature (e.g., $SiF_4$) and hence do not require bubblers to generate the requisite vapor pressure.

Importantly, the aerosol generators 12a, 12a' enable us to deliver LVP dopants (e.g., RE dopants) at low temperatures to the MCVD system and at concentrations high enough to maintain standard deposition rates.

Each source 12 heats the precursor to a temperature well above room temperature in order to generate the precursor gases at the desired vapor pressure. For example, for silica and ordinary dopants (e.g., index-raising dopants such as Ge and P) the precursor is typically heated to 30-50° C. (e.g., 38° C.). Moreover, for dopants derived from LVP precursors (e.g., RE dopants such as Er and Yb) the situation is much more severe—they are typically heated to 800-1100° C. (e.g., 900° C. for the precursor $ErCl_3$; 950° C. for $YbCl_3$). However, because the tubing 18, which couples the generators to the MCVD system 16 is typically maintained at a much lower temperature (e.g., 50-100° C.; by heaters well-known, but not shown) than the LVP dopant source in the generator 12a, such hot gases cannot be delivered via the significantly lower temperature tubing to the MCVD system because the hot LVP precursor gases would condense and deposit onto the inner wall of the tubing. Our solution to this problem is to generate the LVP fiber constituents as aerosols that can be delivered to the MCVD system 16 via tubing 18 maintained at or slightly above room temperature. In any case, the tubing 18 should be maintained at a temperature (e.g., 70° C.) higher than the temperature (e.g., 38° C.) of the hottest bubbler 12b, 12c, 12d if the aerosol is mixed with the HVP vapors, as shown in FIG. 1. On the other hand, if the aerosol is delivered directly to the deposition system 16 without being first mixed with the HVP vapors, then all of the tubing connected to the output of an aerosol generator (e.g., 12a) may be at room temperature.

Although our invention is not dependent on the following theory of operation, we believe that the following phenomena take place. When the RE chloride aerosol enters the hot zone of the MCVD system, which is also supplied with oxygen, most of the aerosol vaporizes into RE chloride vapor. Then, the vaporized RE chloride (gas) molecules oxidize forming RE oxide molecules, which collide with other oxide molecules (e.g., $SiO_2$ molecules) and deposit as soot onto the inside walls of the substrate tube. After sintering, this process forms a very homogeneous glass. Significantly, our invention enables independent control of the two key processes (dopant delivery and oxidation). Conditions are set at the aerosol generator to produce particles having a predetermined (e.g., optimum or near optimum) size range, enabling the desired LVP dopant concentration to be delivered to the headstock tube with little loss. As the aerosol particles reach the hot zone, we believe that most of them vaporize into individual molecules, thereby loosing any history of their previous size as a particle. In the hot zone these vaporized molecules are oxidized. Conditions in the hot zone can then be set (e.g., optimized or nearly optimized independent of any aerosol generator conditions) so that all the dopants react together to form an essentially homogeneous glass.

It should be noted that there may be rare cases in which clusters of a LVP dopant are desired in the glass. In such situations, the aerosol particles should be oxidized before reaching the hot zone. The LVP oxide particles can then be filtered before being delivered so only the optimal cluster size is formed in the glass. The cluster size is determined in this case by the delivered dopant oxide because the particles do not vaporize (change size) in the hot zone.

Aerosol Particle Size

The size of the aerosol particles is preferably in the approximate range of 0.01 μm to 1.0 μm. On the other hand, particles as large as 10 μm can be delivered, if needed, provided care is taken to minimize the distance between the aerosol generator and the substrate tube. If the particles are significantly larger than 1 μm, they will settle on the inside wall of the delivery tubing due to gravity. If they are significantly smaller than 0.01 μm, they will deposit on the tubing wall due to Brownian motion. In one embodiment of our invention, we remove large particles during delivery, which is extremely advantageous because in most cases large particles produce clusters in RE-doped fibers, and clusters are known to cause undesirable processes such as up-conversion.

Although some RE-aerosol particles may be inherently removed in the tubing 18 or in other components of the delivery system (e.g., the condensation chamber 12.1 discussed later), this type of particle filtering is not readily controlled. Therefore, in accordance with one embodiment of our invention, these particles are passed through filters 14, which are interposed between aerosol generators 12a, 12a' and deposition system 16. The filters may include a well-known diffusion battery to remove small particles (e.g., those below 0.01 μm). In addition, to remove large particles (e.g., those above 1.0 μm) the filters 14 may include a well-known cyclone, or a piece of tubing with several bends (e.g., a coil), or a settling chamber, depending on how efficiently the user desires to remove larger particles.

The collection efficiency of a coil of tubing for a given particle size is a function of the tubing's inside diameter, number of loops in the coil, flow rate, and the gas and particle properties. For example, consider $YbCl_3$ particles in He flowing through four tubes having inside diameters of 1.5, 2, 3 and 4 mm, each tube having two and half loops. For 1.0 μm particles the collection efficiency of the different diameter coils is about 92%, 65%, 27% and 12%, respectively; for 1.4 μm particles the corresponding efficiency is about 99%, 84%, 48%, and 26%, respectively; and for 2.0 μm particles the corresponding efficiency is about 100%, 100%, 72%, and 42%, respectively. Thus, the smaller diameter tubing (1.5 mm and 2 mm) collects nearly all of the particles with sizes above about 2 μm, whereas the larger diameter tubing (3 mm and 4 mm) does not collect nearly all of the particles until the particle size reaches about 4 μm (3 mm tubing) and greater than 5 μm (4 mm tubing). See, D. Y. H. Pui et al., *Aerosol Sci. and Tech.*, Vol. 7, pp. 301-315 (1987), which is incorporated herein by reference.

Aerosol particle size is commonly controlled by the particle collision and coalescence times, which are discussed more fully below in conjunction with the description of aerosol generator 12a of FIG. 2.

Since aerosol particle size is important to the efficient delivery of LVP dopants, it may be advantageous to include a feedback subsystem 30 in the delivery system to monitor the size and/or number of particles delivered to the deposition system and, in response thereto, to control the operating parameters of generators 12a, 12a' and/or filter 14. As shown in FIG. 1, feedback subsystem 30 includes a sensor 30.1 that senses the size and/or number of particles generated by aerosol generator 12a. A monitor 30.2 processes the signal generated by sensor 30.1 and transmits a control (e.g., error) signal to a controller 30.3, which in turn transmits one or more control signals on output bus 30.4. The latter control signals control components of the delivery system that alter the size and number of aerosol particles. Such components include mass flow controllers that control the flow rate of various gases and/or heaters that control the temperature(s) of the aerosol generator 12a.

Monitor 30.2 might include, for example, a commercially available particle sizer spectrometer (not shown).

Aerosol Generator

Although the prior art teaches a number of ways to generate aerosols that are suitable for use in our invention, a preferred design of the aerosol generators 12a, 12a' is shown in FIG. 2. In accordance with this aspect of our invention, aerosol generator 12a, 12a' comprises a vessel 12.1 a first chamber 12.2 and a second chamber 12.3 coupled in fluid-flow communication with one another. In one embodiment, the first chamber is a bubbler chamber 12.2 located in a first (e.g., lower) portion, and the second chamber is a condenser chamber 12.3 located in a second (e.g., upper) portion. A bulb-like region 12.8 is coupled to the bottom of the bubbler chamber 12.2. A first heater 12.4a surrounds the lower portion; i.e., both the bubbler chamber 12.2 and bulb-like region 12.8. A first input port 12.5 enables primary carrier gas (e.g., He) to be fed into the bulb-like region 12.8 via tube 22, and a second input port 12.6 enables cooler secondary carrier gas (e.g., room temperature He) to be piped into the condenser chamber 12.3 via tube 24. Preferably a second heater surrounds all (or a significant fraction) of the condenser chamber 12.3. The second heater 12.4b maintains the condenser chamber 12.3 at a lower temperature than the bubbler chamber 12.2 in order to minimize condensation on the glass wall and to produce the desired aerosol particle size(s). An output tube 26 is coupled to the condenser chamber 12.3 via output port 12.7.

Although the above description suggests that bubbler chamber 12.2 and condenser chamber 12.3 are located in lower and upper portions, respectively, of generator 12a, it will be apparent to those skilled in the art that the two chambers may be located in other positions (e.g., side by side).

In operation, the bulb-like region 12.8 is filled with a high purity LVP precursor solid 12.9 (e.g., a 6-9's pure RE-chloride available from commercial sources), which is heated to a relatively high temperature (e.g., 800-1100° C.) sufficient to liquefy the precursor and to obtain a desired vapor pressure. The primary carrier gas bubbles through the liquefied precursor, entraining the precursor vapor away from the precursor liquid (hot region) and into the condenser chamber 12.3 (cooler region). (Preferably, the precursor vapor fully saturates the primary carrier gas in the bulb like region 12.8.) However, in the condenser chamber 12.3, which is maintained at a significantly lower temperature (e.g., 500° C.), the precursor vapor is supersaturated. Consequently, a RE aerosol 12.0 forms in the condenser chamber 12.3 and exits the vessel via the output port 12.7. The latter port is coupled in fluid-flow communication with the MCVD system 16 via output tube 26 and delivery tubing 18 (FIG. 1), which are maintained at or slightly above room temperature. More specifically, tubing 18 should be heated to a temperature (e.g., 70° C.) slightly higher that of the highest temperature HVP bubbler (e.g., 38° C. for $SiCl_4$ bubbler 12b in the embodiment of FIG. 1) to keep the HVP precursor from condensing on the tubing during delivery. Depending on the delivery system design, as mentioned previously, the aerosol can be delivered either at room temperature or at this slightly higher temperature. Once the aerosol reaches the hot zone of the MCVD system where deposition on the substrate tube 16.2 is to take place, it is vaporized and converted to an oxide, as discussed previously.

In another embodiment of generator 12a, the first chamber 12.2 is a reaction chamber. In this case, a sub-precursor (e.g., Al metal) is placed in the first chamber and heated, and the primary gas is a gas (e.g., $Cl_2$) that reacts with the sub-precursor to generate a precursor compound (e.g., $Al_2Cl_6$) in vapor form. This vapor is convected into the condenser chamber, a cooler secondary carrier gas (e.g., He) is flowed into the condenser chamber, and an aerosol is formed in the manner described above.

In either embodiment, the vapor convected into the second (condenser) chamber 12.3 includes at least one chemical element derived from the LVP substance (precursor or sub-precursor), that element ultimately becoming a dopant in the glass body formed.

The coupling between precursor sources 12 and the MCVD system 16 is illustratively controlled by means of three-way valves 13a-d. Each valve has an off, vent and run position. As shown, the valves are in the vent position, which enables the generators to run continuously and to deliver the precursor to the MCVD system 16 only when needed. This feature reduces start up fluctuations. When the apparatus 10 is ready to deliver precursor aerosols to the MCVD system 16, preselected valves are rotated to their run positions, which places the corresponding selected sources 12 in fluid-flow communication with system 16.

As noted earlier, aerosol particle size is commonly determined by the particle collision and coalescence times. Collision time, which varies with volume loading (aerosol volume per carrier gas volume) is controlled by the temperature of heater 12.4a (i.e., the temperature of the RE chloride 12.9), the flow rate of primary carrier gas into tube 22 and flow rate of dilution gas into tube 24. On the other hand, the coalescence time is controlled by the temperature of heater 12.4b (i.e., the temperature of condenser chamber 12.3), the fraction of the condenser chamber not surrounded by heater 12.4b, the shape of the condenser chamber exit port 12.7, the flow rate of the dilution gas into tube 24, and the temperature of the dilution gas.

Our system has a number of important features and advantages: (1) The ability to utilize high purity precursors, such as metal chlorides, obviates the need for additional purification steps; (2) The size and design of our aerosol generators enables them to produce essentially the same mass output for relatively long periods of time (e.g., the long residence time of the carrier gas bubbles in contact with the precursor and the ability to generate small bubbles (large surface-to-volume ratio) insures that the precursor vapor reaches equilibrium with the carrier gas. The generators can easily be designed to need refilling only after several hundred hours of use, which makes the set up time between MCVD preforms as quick as that for preforms made with only HVP dopants; and (3) Our aerosol generators are independent of other parts of the system. This feature allows any number of aerosol generators (many potential dopants) to be added to the deposition system. (As mentioned above, the aerosol generators are illustratively added in parallel, not in series.) In addition, our delivery system, and hence the overall fiber fabrication system incorporating it, is less dependent on the performance of either the system operators or the apparatus itself; that is, our aerosol precursor reaches saturation with the carrier gas, and temperature is easier to control and is known more accurately than in prior art approaches. Moreover, the three-way switches allow our LVP precursor generators (as well as the standard bubblers) to be always running in an equilibrium state. (Precursor vapor pressure does not change significantly over time.)

Operating Conditions

This section describes illustrative operating conditions for the MCVD fabrication of a Yb-doped optical fiber in accordance with one embodiment of our invention. Aerosol generator 12a contains the precursor $YbCl_3$. The amount of $YbCl_3$ and the shape of the generator enable the $YbCl_3$ to reach its equilibrium vapor pressure when the primary He flow via tube 22 is flowed (bubbled) through it. The generator's standard operating temperature is 950° C. but can be purposely raised or lowered (e.g., 800° C.-1100° C.) when higher or lower aerosol volume loadings are desired. As described previously, there are typically two He flows (via tubes 22, 24) into the aerosol generator 12a. Primary He flow via tube 22 flows to the bottom of the bulb-like region 12.8 where it bubbles through the liquefied $YbCl_3$ 12.9. The secondary He flow via tube 24, which is optional but preferred, ranges from room temperature to 950° C. (e.g., 500° C.) and flows into the condenser chamber 12.3 where it cools the saturated $YbCl_3$ vapor, supersaturates it and forms an aerosol. Secondary He flow also dilutes the aerosol volume loading. Typically the total flow (bubbler and dilution) is kept constant and in the range of about 0.5-2 liters/min. Standard flow is about 0.5 liter/min for each of the He flows. Typical ranges are about 0.2-1 liters/min, but higher or lower flow rates can be used.

The temperature of heaters 12.4a, 12.4b and the flow rates of the He carrier gasses are set before the run starts to insure that the system is running at equilibrium conditions. During startup or whenever the YbCl$_3$ aerosol is not being delivered to the MCVD system 16, the aerosol is sent to the vent instead of the system 16 using three-way valve 13a.

The MCVD system 16 is set up and operated in standard fashion. Assuming non-Yb doped glass layers are desired in, for example, the fiber cladding, these layers are fabricated by closing valve 13a but otherwise using standard MCVD techniques. Illustratively, Yb doping is present only in the fiber core, and the Yb distribution is essentially radially uniform. At the end of the last cladding layer, valve 13a is switched on so that the YbCl$_3$ aerosol flows into the delivery tubing. The aerosol flows to the rotating seal along with all the other selected vapor dopants; e.g., SiCl$_4$ and GeCl$_4$ are selected by switching on valves 13b and 13c and switching off valve 13d. The soot is formed, deposited, and sintered on the inside wall of the substrate tube 16.2 using standard MCVD methods and temperatures. There is no need for extra purification passes. When the desired number of Yb-doped core layers is deposited, all the aerosol and vapor dopants flows are turned off using individual three-way valves 13a to 13d. The pressure in the substrate tube 16.2 is lowered, and the tube 16.2 is collapsed into a preform using standard MCVD techniques. The preform is then drawn into suitable lengths of optical fiber, again using standard fiber drawing techniques.

Illustrative conditions and flow rates for the deposition of core layers are: (1) YbCl$_3$ aerosol generator 12a: temperature of heater 12.4a=950° C.; temperature of heater 12.4b=500° C. (typically between room temperature and the temperature of heater 12.4a); flow rate of primary He (bubbler flow rate) =0.5 liter/min; and flow rate of secondary He (dilution flow rate)=0.5 liter/min; and (2) SiCl$_4$ generator 12b: temperature of heater=38° C. (suitable range 25-60° C.); O$_2$ flow rate through the vapor generator 12b=100 sccm (suitable range 50-2000 sccm); and additional O$_2$ flow rate not through generator 12b=900 sccm (suitable range 0-2000 sccm); traverse rate of torch 16.5=80 mm/min (suitable range 40-200 mm/min); and deposition/sinter temperature of preform tube 16.2=2000° C. (suitable range 1700-2500° C.).

Typically five or more core passes (translations of heat source 16.6 along substrate tube 16.2) are made in order to deposit correspondingly five or more RE-doped core layers. More than five, or fewer than five, layers may be deposited, of course.

Suitable tubing includes ⅜-inch outside diameter Teflon tubing 18 to deliver the aerosol and vapors from the generators 12 to the rotating seal. A suitable settling chamber (as optional filter 14) to filter out the large YbCl$_3$ particles comprises a 3-inch inside diameter tube, which slows down the flow sufficiently that large particles settled out of the carrier gas stream due to gravity.

In yet another embodiment, our method does not employ any organic compounds (e.g., solvents or precursors) and, as such, is also free of undesirable contaminants (e.g., H$_2$O and other hydrogen-containing species) that are by-products of the use of such compounds in the prior art. In particular, the LVP aerosol particles and carrier gas are free of organic compounds. Consequently, our process does not require any additional purification steps to remove such contaminants.

EXAMPLES

These examples describe the fabrication of Yb-doped silica optical fibers. Various materials, dimensions and operating conditions are provided by way of illustration only and, unless otherwise expressly stated, are not intended to limit the scope of the invention. In these examples, YbCl$_3$ was the LVP precursor of Yb, and Yb was used as a dopant in the silica fiber. (Yb was actually incorporated in the fiber as an oxide, but it was the Yb element that altered the gain properties of the doped silica, as is well known in the art.) A settling chamber was used as a filter 14.

Example 1

The first example outlines a Yb—Al-doped silica preform that we fabricated. The YbCl$_3$ aerosol generator 12a was maintained at 975° C. to achieve a high concentration of Yb. The primary He flow that bubbled through the molten YbCl$_3$ was set to 0.5 liters/min, and the secondary He flow that cooled the saturated YbCl$_3$ vapor in the condenser chamber 12.1 was set to 0.3 liters/min. These conditions for the aerosol generator were maintained for 1 hr before delivery to allow the system to reach equilibrium.

The MCVD system 16 was set up in the usual fashion, and all steps prior to the deposition of the Yb—Al-doped silica soot layers were carried out with the aerosol three-way valve 13a set to vent and using standard MCVD techniques. For deposition of the Yb—Al-doped layers, the valve 13a was switched so that the aerosol entered the delivery tube and mixed with the other precursor and process gases (e.g., He, O$_2$). The SiCl$_4$ bubbler 12b was maintained at 38° C. 100 sccm of O$_2$ was bubbled through the SiCl$_4$ precursor. Al$_2$Cl$_6$ vapor was used as a precursor for Al (incorporated as an oxide in silica) and was flowed directly into the substrate tube 16.2 at a rate of 6.7 sccm. In addition to the precursors, 900 sccm of O$_2$ and 400 sccm of He were flowed to assist in oxidation and sintering, respectively. The precursors were oxidized by traversing the H$_2$/O$_2$ torch 16.5 across the substrate tube 16.2 to heat the outside surface of the tube to 2100° C.

A suitable number of cladding layers were first deposited. Then, after eight Yb—Al-doped core layers were deposited, the valve 13a was returned to the vent position, the pressure in the substrate tube was reduced, and the substrate tube containing the deposited layers was collapsed into a rod in the usual fashion. The difference in refractive index between the Yb—Al-doped region and the undoped region of this preform was 0.007 and the Yb concentration was approximately 1.6 wt %. The eight layers produced a cross sectional area of 7 mm$^2$.

Example 2

The second example outlines the fabrication of another Yb—Al-doped silica preform, as well as a fiber we drew from it. The aerosol generator 12a was maintained at 950° C. The primary He flow that bubbled through the molten YbCl$_3$ was set to 0.38 liters/min and the secondary He flow that cooled the saturated YbCl$_3$ vapor in the condenser chamber 12.1 was set to 0.5 liters/min. These conditions for the aerosol generator were maintained for 1 hr before delivery to allow the system to reach equilibrium.

The MCVD system 16 was set up in the usual fashion and all steps prior to the deposition of the Yb—Al-doped silica were carried out with the aerosol three-way valve 13a set to vent using standard MCVD techniques. For deposition of the Yb—Al-doped layers, the valve 13a was switched so that the aerosol entered the delivery tube and mixed with the other precursor and process gases. The SiCl$_a$ bubbler 12b was maintained at 38° C. 100 sccm of O$_2$ was bubbled through the SiCl$_4$ precursor. As in Example 1, Al$_2$Cl$_6$ vapor was used as a precursor for Al and was flowed directly into the substrate tube 16.2 at a rate of 5 sccm. In addition to the precursors 900 sccm of O$_2$ and 200 sccm of He were flowed to assist in oxidation and sintering, respectively. The precursors were oxidized by traversing a $H_2/O_2$ torch across the substrate tube 16.2 to heat the outside surface of the tube to 2000° C.

A suitable number of cladding layers were first deposited. Then, after eight Yb—Al-doped core layers were deposited, the valve 13a was returned to the vent position, the pressure in the substrate tube was reduced, and the substrate tube containing the deposited layers was collapsed into a rod in the usual fashion. The difference in refractive index between the Yb—Al-doped region and the undoped region of this preform was 0.006 and the Yb concentration was approximately 0.8 wt %. The eight layers produced a cross sectional area of 7 mm$^2$.

This preform was then jacketed with a silica tube and drawn into a fiber to obtain the correct core/clad geometry to sustain single-transverse-mode operation at a pump wavelength of 975 nm.

Figure 3:
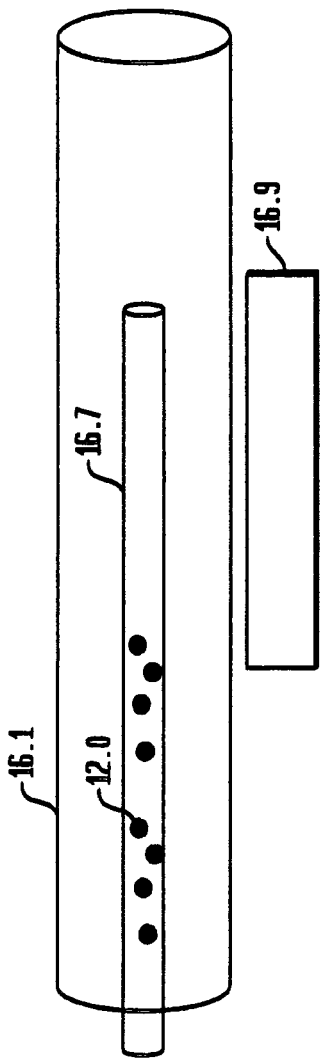
FIG. 3 is a schematic, partially isometric view of a feedstock tube with a concentric inner tube positioned therein for vaporizing the aerosol before it enters an MCVD preform tube, in accordance with still another embodiment of our invention.
Figure 4:
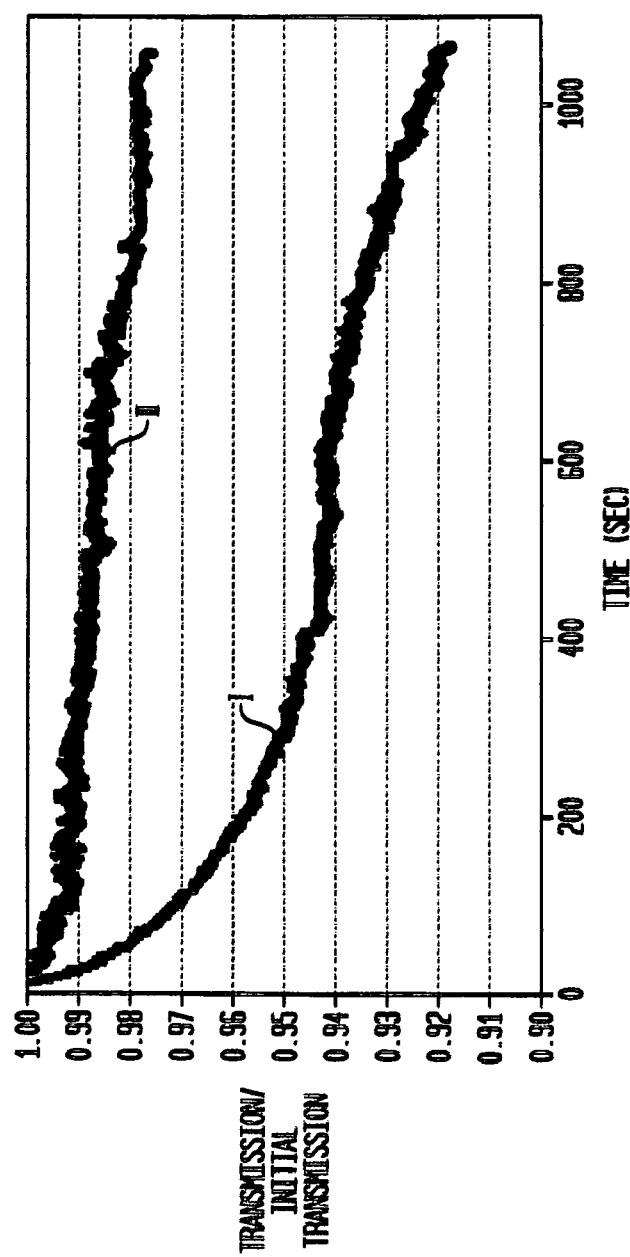
FIG. 4 is a graph showing how the transmission of light in Yb-doped silica fibers degrades with time (photodarkening) for two different cases.

Optical fibers with Yb—Al-doped core regions, fabricated as described above, exhibited significantly reduced photo-darkening—below that of the best commercially available fiber known to us. More specifically, FIG. 3 compares two cases: Curve I—a commercially available Yb-doped fiber that is advertised and sold as a low-photodarkening fiber, and Curve II—a Yb-doped fiber that was fabricated using a standard MCVD system in which the $YbCl_3$-precursor was delivered as a SCA, in accordance with one embodiment of our invention.

The commercially available fiber (Curve I) lost about 8% of its initial power after 1000 sec, but our fiber performed four times better than that, losing only about 2% of its initial power in the same time interval. To our knowledge our fiber has exhibited the best photodarkening characteristics of any high concentration Yb-doped silica fiber.

Alternative Embodiments

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

In particular, there are many ways to form a SCA. We prefer to quickly cool a carrier gas stream that is saturated with the precursor vapor, causing supersaturation, which in turn causes the precursor to homogeneously nucleate, forming aerosol particles. Cooling can occur by conductive cooling, radiative cooling, mixing, or adiabatic expansion. (See, for example, S. K. Friedlander, *Smoke Dust and Haze*, John Wiley & Sons, New York, N.Y., 1977, which is incorporated herein by reference.). However, chemical reactions can also be used to form an aerosol. For example, as discussed earlier, reacting a RE chloride with oxygen at a temperature at which the RE chloride is a vapor (e.g., at 950° C.). At this high temperature the oxide will form an RE oxide aerosol. On the other hand, a sub-precursor such as aluminum (Al) can be reacted with $Cl_2$ to produce $Al_2Cl_6$ vapor (e.g., at 350° C.), which can then be cooled to form an aerosol. (See, the earlier description of the generator 12a in which the first chamber 12.2 is a reaction chamber.)

In addition, it may be advantageous to vaporize the aerosol particles before flowing them into the preform tube 16.2. As shown in FIG. 3, the aerosol 12.0 flows in tube 16.7 that is concentrically positioned within the feedstock tube 16.1. Near its end the inner tube 16.7 is heated by means of an external heat source 16.9. The aerosol 12.0 will vaporize and then be flowed as a vapor into the preform tube 16.2 (FIG. 1). Oxygen is flowed in the feedstock tube 16.1 to oxidize the aerosol and vapors delivered by the delivery system of FIG. 1. Alternatively, the oxygen may be flowed in the inner tube 16.7 and the aerosol may be flowed in the feedstock tube 16.1. (The primary purpose of the inner tube is to keep the aerosol and oxygen separated so that the aerosol is not oxidized prematurely; i.e., before it is vaporized.)

This method may be desirable if the aerosol particles are made larger for higher mass loadings or if the aerosol particles agglomerate too much due to long delivery residence times (notwithstanding filtering) and the fiber starts to show signs of undesirable rare earth clustering. When the heated tube 16.7 is not used, the particles either vaporize as they approach the MCVD system's hot zone forming the ideal (LVP vapor mixed with HVP vapors) or they oxidize before vaporizing. The size of the delivered particles is important in terms of delivery efficiency but not in terms of the fiber's optical properties if they vaporize completely before oxidizing. There is some indication that this is what happens with $YbCl_3$. With other RE dopants, however, the RE-chloride particles may oxidize first, in which case their size will influence the size of the oxide particles and therefore their size is important and needs to be as small as possible.

Instead of delivering the aerosols as metal chlorides to the deposition system, it is also possible to deliver them as oxides. For example, an optional oxidizer may be interposed between each of the aerosol generators 12a, 12a' and the deposition system 16. The oxidizer may be a separate oxidizing chamber 20, as shown in FIG. 1, or it may simply be the upper chamber 12.3 of generator 12a (with $O_2$ flow into via tube 24 and He flow into tube 22). However, oxides have an extremely low vapor pressure, which means that the oxide particles will not vaporize in the hot zone of the substrate tube, leading to less homogeneity in the deposited glass layers. Nevertheless, those skilled in the art might find it advantageous for other reasons to deliver the aerosol as an oxide; for example, if use of an oxide improves the delivery of the aerosol particles, or if use of an oxide is the only way to form an aerosol of a particular dopant.

Finally, certain embodiments of our aerosol process are described and claimed as a method/apparatus for fabricating an optical waveguide, which, in the case of fabricating an optical fiber, is intended to include the sub-process of first fabricating a preform from which a fiber is subsequently drawn.

Multi-Component Aerosols

As noted earlier, the aerosols used in our invention may be either SCAs or MCAs. In the latter case, each aerosol particle comprises at least two compounds that include precursors (e.g., chlorides) of the dopants or host material and/or oxides of the dopants or host materials. For example, a MCA could comprise particles each of which is a composite of two (or more) RE dopant precursors, such as $YbCl_3$ and $ErCl_3$. Alternatively, a MCA could comprise particles each of which is a composite of a RE dopant precursor and a non-RE LVP dopant, such as $YbCl_3$ and $Al_2O_3$ (alumina), respectively. On the other hand, a MCA could comprise particles each of which is a composite of a RE dopant precursor (e.g., $YbCl_3$) and an oxide of a HVP dopant (e.g., $GeO_2$) and/or an oxide of host material (e.g., $SiO_2$).

A MCA aerosol can be generated, for example, by using the generator 12a of FIG. 2. Thus, the cooler secondary carrier gas of generator 12a may include suitable seed particles to seed condensation of a RE vapor. Alternatively, the seed particles may themselves be generated by another, separate generator. In general, seed particles may be LVP precursors or oxides, such as RE chlorides or alumina; or they may be HVP oxides, such as $SiO_2$ or $GeO_2$, or a combination of them; i.e., a multi-component seed aerosol.

In the latter case, the seed particles are preferably a homogeneous composition of each of the aerosol's constituents, which is advantageous in the production of homogeneous glass bodies, particular optical fibers.

Therefore, in accordance with another aspect of our invention, we claim a method of fabricating a glass body that includes a multiplicity of constituents, at least one constituent being a first dopant having a first LVP precursor comprising the steps of: (a) generating a first aerosol comprising first particles that include the first LVP precursor, the generating step including the steps of (a1) providing a vapor of the LVP precursor and (a2) supersaturating the LVP vapor to form the aerosol; (b) separately generating vapors of the other constituents; (c) convecting the aerosol of step (a) and the vapors of step (b) to a deposition system including a substrate; and (d) forming on a surface of the substrate at least one doped layer comprising the dopants contained in the aerosol and vapors convected in step (c). In this aspect of our invention, the aerosol may be either a MCA or a SCA.

This method may be practiced using the apparatus previously described in conjunction with FIGS. 1-2.

We claim:

1. An aerosol generator comprising a vessel having first and second chambers in fluid-flow communication with one another, said first chamber configured to contain a LVP substance, a heater configured to heat said substance, a first input port configured to flow a primary gas into said first chamber, thereby to generate in said second chamber a vapor compound that includes at least one element of said substance, a second input port configured to flow a cooler carrier gas into said second chamber, thereby to condense said vapor and form an aerosol therefrom, and an output port configured to extract said aerosol from the vessel.

* * * * *